Patented Feb. 27, 1945

2,370,154

UNITED STATES PATENT OFFICE 2,370,154

PROCESS FOR THE ISOLATION OF THE LACTOGENIC HORMONE

Gerhard A. Fleischer and Erwin Schwenk, Montclair, N. J., assignors to Schering Corporation, Bloomfield, N. J., a corporation of New Jersey No Drawing. Application January 31, 1941, Serial No. 376,854

13 Claims. (Cl. 167—74)

The present invention relates to the isolation of the lactogenic hormone from various source materials containing the same and to the production of the hormone in a very pure condition.

It is the object of the invention to provide a simple and economical process for the efficient isolation of the lactogenic hormone, known also as prolactin, from different mixtures containing the same, and particularly from mixtures containing other protein or protein-like substances. More specifically, it is an object of the invention to provide a process whereby prolactin may be manufactured in a highly pure form. Other objects and advantages of the invention will appear from the description hereinafter.

It is known that prolactin, the lactogenic hormone from the anterior lobe of the pituitary, is soluble in diluted water-miscible solvents like alcohol or acetone in the presence of either alkali or acids. It is also known that by increasing the concentration of the organic solvent it is possible to precipitate the active material in much the same way as other protein or protein-like materials, and it was generally accepted that in the matter of solubility, the lactogenic hormone was similar in its behavior to the other protein or protein-like substances. Thus, R. W. Bates and O. Riddle (J. Pharmac. and Exp. Ther. 55:365 (1935)) extract the prolactin with 70% ethanol at a pH of 9-10 and precipitate it from the extract at an alcohol concentration of 86% and at a pH of 5.5-6.0, i. e. near the isoelectric point of prolactin. Lyons (Proc. Soc. Exper. Biol. and Med. 35:645-648 (1937)), on the other hand, extracts the hormone with 82% acetone containing HCl, and precipitates it by increasing the concentration of the acetone to 90%.

It was therefore most surprising when we discovered that the lactogenic hormone, at a pH value lower than 5.5, is highly soluble in organic solvents like methanol, ethanol, propylene glycol, butanol, glycerol, and other liquid alcohols of ionizing, electrically conducting, solvate-forming or associated character (Taylor, "Treatise on Physical Chemistry," vol. 1, pp. 355, 726), which are miscible with water in all proportions or to a considerable extent, even when the concentration of the organic solvent is such as ordinarily to cause precipitation of the hormone, such concentration in the case of methanol being even as high as 100%; and that it can be recovered from such solutions by the addition of a non-ionizing, non-conducting, non-solvate-forming or non-associated organic solvent, which is miscible with the organic solvent of the first-mentioned type, but in which the hormone is not soluble, like acetone, ether, chloroform, carbon tetrachloride, benzene, organic esters, like ethyl acetate, and the like, or by the addition of an alkali, like alcoholic or aqueous sodium hydroxide, ammonia, etc. This observation is so much the more unexpected, as it is known that animal proteins are in general not soluble in either of the just-mentioned groups of organic solvents; and this is generally true even of plant proteins, except for a very small group of such proteins which are soluble in alcohol (zein, gliadin, hordein). Mineral as well as organic acids and also phenols may be used for acidification so long as they are able to provide a pH value lower than 5.5, preferably between 1 and 4. Even such acids as are known to be protein precipitants, like trichloroacetic acid or sulphosalicylic acid, may be used to provide the required hydrogen ion concentration. We have found that the salts which prolactin forms with sulphosalicylic or trichloro-acetic acid are extremely soluble in pure methanol, in ethyl alcohol and the like, and are not precipitated by even a large excess of the acid. The solubility of these salts in methanol, etc., is so high that only large quantities of ether or acetone will precipitate the hormone from such solutions. This behavior is in marked contrast to its action in water solution, for in such solution, prolactin behaves like a true protein in that it is there precipitated completely by trichloro-acetic acid or sulphosalicylic acid.

The practical value of our discovery is obvious. By extracting crude or only partly purified materials containing the lactogenic hormone with an organic solvent of the first-mentioned type, which for the sake of brevity, will be referred to hereinafter, as "ionizing" liquids or solvents, under relatively strongly acid conditions, the bulk of the inert proteins and most of the other pituitary hormones remain undissolved, so that a highly efficient separation is accomplished by the simple extraction step. From the acidified ionizing organic solvent, the lactogenic hormone itself can be isolated simply by precipitating it with an alkali or with ether, acetone, or other solvent of the second-described type, which will be referred to hereinafter as a "non-ionizing" liquid or solvent. Thus a prolactin preparation of a very high degree of purity can be obtained in a single step. Another great advantage of this process lies in the fact that it gives an excellent yield, higher than any method hitherto known. The reason for this, as we have found, is the following: Prolactin, like many other proteins, tends to form complex compounds with certain inert proteins when the latter are precipitated from a watery solution. Such complex compounds are only slightly dissociated in water, and the fact that both partners, prolactin as well as inert protein, have similar solubilities in water, makes it very difficult to reclaim that part of the hormone which has become associated with the inert proteins, and this goal can only be reached after often repeated re-precipitations. If, however, the extraction is made with the organic solvents described hereinabove, in which the inert protein is completely insoluble, then the dissociation of such complex compounds is complete, and practically all of the prolactin is extracted.

The prolactin which we thus obtain in a single step is already as pure as, or even purer than, the International Standard Preparation. It is free from any gonadotropic or thyreotropic activity; it is, however, contaminated with adrenotropic and growth hormone if the starting material contained these substances, and, if undissected pituitaries have been used as starting material, also hormones of the posterior lobe may be found in it. The latter hormones can easily be separated according to our copending application "Process for the separation of the hormone and hormone-like components of the pituitary gland," filed November 6, 1940, Serial No. 364,542.

For obtaining a prolactin free from adrenotropic and growth activity we have found the following method of purification to be effective: The solution of the hormone in the ionizing organic solvent at a relatively strongly acid pH, that is, about 4.0 or below, e. g. in alcohol, is neutralized stepwise, for instance with a 1-molar alcoholic sodium hydroxide solution. The precipitation up to pH 4.7 does not contain much lactogenic activity but is active with respect to growth. If the solution is further neutralized to pH 5.5 a prolactin is precipitated which is practically free from any of the other hormones and is about 3 times as active as the International Standard Preparation. Such high degree of purity has never been attained heretofore.

Instead of gradually neutralizing an acid solution containing the hormone it is also possible to fractionate such a solution by means of an organic solvent of the above described character in which the hormone is insoluble, like ether, acetone, etc. The amount of solvent to be used depends on the concentration of the hormone and the kind of solvent and/or acid previously used to extract the hormone and can be determined by simple experiment for each individual case.

As is known, prolactin can be found not only in pituitaries, but also in liver, urine and other sources, though in much smaller quantities, and our method of preparation is not confined to any one starting material, but can be generally applied.

The solubility of prolactin salts, such as the hydrohalides, and particularly the hydrochloride, acetate, sulfosalicylate, trichloracetate, etc., in propylene-glycol, glycerol and similar non-toxic liquids, can be utilized to prepare stable solutions for injection.

Where the hormone has only a limited solubility in the ionizing liquid organic solvent, sufficient water should be present to effect solution of all of the hormone. In the case of methyl alcohol, however, in which the hormone is soluble without the presence of water, no water need be used, and in such case hydrocarbon oils can be employed as the non-ionizing liquid to effect precipitation of the hormone. The non-ionizing liquids that will work best with any particular solution in an ionizing liquid can be determined by simple experimentation, as will be obvious to the chemist.

The ionizing liquids employed in our process are soluble in water, although some, like butanol, have only a limited solubility. The ionizing liquid used in any particular case should be miscible with the subsequently added non-ionizing liquid, at least in the proportions used in the process.

Our invention will be described in greater detail in the following examples which are presented by way of illustration only.

*Example 1*

10 gm. of an acetone-dried powder extract of beef anterior pituitaries are stirred for 1 hour at room temperature with 1 liter of 95% alcohol +1½ cc. of conc. HCl. The mixture is then centrifuged, and the supernatant liquor is decanted and precipitated with about 12 cc. of an alcoholic 1-molar NaOH in order to provide a pH value of between 7 and 9. The precipitate is allowed to settle in the icebox overnight and is then separated either by centrifuging or by filtering. Finally, it is dried with ether. Yield about 400–600 mg. varying with the quality of the pituitary powder. Assay: 10–12 Riddle units per mg.

*Example 2*

1 kg. of frozen undissected sheep pituitaries is mixed with 3 liters of water and this mixture is adjusted to pH 9.0 by means of 20% NaOH and stirred at that pH for 8 hours. Acetic acid is then added until a pH of between 5.5 and 6.0 is reached. The mixture is shaken with 2 liters of chloroform for 1 hour, yielding a chloroform gel, and is then centrifuged in a bottle-centrifuge. The supernatant water layer containing the thyreotropic and gonadotropic hormones is poured off and is worked up separately. The chloroform gel, however, is rid of as much chloroform as possible and is then dried with acetone. About 180 gm. of acetone powder result. They are stirred into 100 times their weight of alcohol (approximately 95%) containing 0.1% of conc. sulfuric acid, and stirring is continued for 1 hour. The mixture is then centrifuged and the clear supernatant liquid decanted. It is precipitated with 2 volumes of ether, yielding about 5 gm. with a total activity of approximately 55,000 Riddle units.

*Example 3*

Frozen undissected sheep pituitaries are extracted and the extract fractionated with chloroform according to Example 2. The dried chloroform gel is then extracted twice with 60% alcohol at pH 9.5 and 10 respectively according to Riddle. The combined extractions are precipitated with 2 volumes of acetone at pH 6. The resulting precipitate weighs about 7.5 gm. per kg. of frozen sheep pituitaries, its activity being about 4.2 Riddle units per mg. 10 gm. of such a product are stirred with 1 liter of 95% alcohol + 2.4 cc. of conc. HCl for 1 hour. The pH of this solution is 1.7. After centrifuging, the supernatant is adjusted to about pH 7 with 18 cc. of an alcoholic 1-molar KOH. The resulting precipitate is separated by filtration and dried with ether. Yield 4.1 gm. having an activity of 10.5 Riddle units per mg.

Example 4

1 gm. of the partly purified product as used in Example 3 is extracted with 100 cc. of propyleneglycol + ¼ cc. of conc. HCl. After stirring for 1 hour, the mixture is centrifuged, decanted and the solution treated with 400 cc. of acetone to precipitate the hormone. Yield about 400 mg of prolactin.

Example 5

1 gm. of the same starting material as in Example 4 is stirred for 1 hour with a solution of 500 mg. of sulfosalicylic acid in 100 cc. methanol. After centrifuging, the supernatant is precipitated with 1 liter of acetone. Yield: same as in Example 4.

Example 6

1 gm. of a purified prolactin, containing 12 Riddle units per mg. are dissolved in 100 cc. of 95% alcohol plus 0.3 cc. of dilute HCl. The pH value of this solution is now changed from 2.5 to 4.5 by means of 0.65 cc. of an alcoholic 1-molar NaOH-solution. The precipitate which occurs is separated by centrifuging. It contains only traces of prolactin. The pH value of the centrifugate is then raised to 4.7 with 0.1 cc. of the alcoholic lye. This is allowed to settle in the icebox overnight and is centrifuged the next morning. The residue contains some activity which can be reclaimed with the next batch. The clear supernatant liquor is precipitated with 0.3 cc. of the alcoholic sodium hydroxide, the pH being thereby raised to 5.5 or slightly higher. This precipitate can be separated by filtering. It weighs 437 mg. and has a potency of 23.6 Riddle units per mg., which is a yield of 93.5%. This very pure prolactin is a white powder revealing crystalline structure under the microscope.

It will be seen from the foregoing that as the ionizing liquid there may in general be employed organic liquids containing one or more OH groups. The extractions are preferably conducted at temperatures no higher than about 30° C. to avoid loss of hormone, temperatures of 20° C. and below being most suitable.

A solution of prolactin in an ionizing organic liquid can be used to make a sterilized preparation by filling the solution into ampules and evaporating the solvent, so that the active material is precipitated in the ampule. Since solutions can be more easily handled and measured than small quantities of solid material, this feature is of considerable commercial advantage. The organic solvent is in this case one of the more volatile alcohols, preferably methyl or ethyl alcohols, which can be evaporated under vacuum or on the water bath. There is thus obtained a sterile preparation which before use for injection can be dissolved in water. The hormone can, however, also be dissolved in water and then filled into ampules.

We claim:

1. Process for the isolation of prolactin, which comprises stirring anterior pituitary lobe material with a liquid alcohol of about 95% concentration and sufficient acid to reduce the pH value below 5.5, and thereafter precipitating prolactin from the extract by raising the pH value thereof.

2. A process for the further purification of partially purified prolactin, which comprises treating the prolactin with a liquid alcohol of about 95% concentration and at a pH value below 4, raising the pH value to about 4.5 and removing any precipitate that is formed, raising the pH value of the solution to about 4.7 and removing the precipitate, and finally raising the pH value of the solution still higher to cause precipitation of the prolactin.

3. Process for the further purification of a partially purified prolactin, which comprises treating the prolactin with a liquid, water-miscible aliphatic alcohol of about 95% concentration and at a pH value below 4 but above 1, and fractionally precipitating the prolactin by raising the pH value of the solution.

4. Process for the isolation of prolactin from mixtures containing the same together with other protein and protein-like substances, which comprises treating the mixture with a liquid, water-miscible saturated aliphatic alcohol of about 95% concentration and at a pH value below 5.5 but above 1.0, separating the solution from the insoluble matter, and recovering the prolactin from such solution.

5. Process for the isolation of prolactin from mixtures containing the same together with other protein and protein-like substances, which comprises treating the mixture with a liquid, water-miscible saturated aliphatic alcohol of about 95% concentration and at a pH value below 5.5 but above 1.0, separating the solution from the insoluble matter, and thereafter precipitating the prolactin from such solution by evaporating the latter.

6. Process according to claim 4, wherein the prolactin is precipitated from the solution by the addition of a non-ionizing organic solvent miscible with the alcohol.

7. Process according to claim 4, wherein the prolactin is recovered from the solution by raising the pH value of the latter until the prolactin is precipitated.

8. Process according to claim 4, wherein the mixture treated with the alcohol is obtained by agitating an aqueous extract of pituitary glands with chloroform under acid conditions, separating the so-formed chloroform gel, and expelling the chloroform.

9. Process according to claim 4, wherein the prolactin is recovered from the solution by fractional precipitation with a non-ionizing organic solvent miscible with the alcohol.

10. Process for the isolation of prolactin from mixtures containing the same together with other protein and protein-like substances, which comprises treating the mixture with a liquid, water-miscible saturated aliphatic alcohol of about 95% concentration and at a pH value lower than 4 but above 1, separating the solution from the insoluble matter, and separating the prolactin from other dissolved material by fractional precipitation by progressive increase of the pH value of the solution.

11. Process according to claim 4 wherein the alcohol is substantially 100% methanol.

12. Process according to claim 4 wherein the alcohol is approximately 95% ethyl alcohol.

13. Process for the isolation of prolactin from mixtures containing the same together with other protein and protein-like substances, which comprises treating the mixture with a liquid, water-miscible aliphatic alcohol of about 95% concentration and containing an organic acid precipitant for the common proteins and adjusted to a pH value below 5.5, separating the solution, and recovering prolactin therefrom.

GERHARD A. FLEISCHER.
ERWIN SCHWENK.